G. E. BADGER.
BILGE PUMP.
APPLICATION FILED FEB. 2, 1909.
1,008,235.
Patented Nov. 7, 1911.
2 SHEETS—SHEET 1.
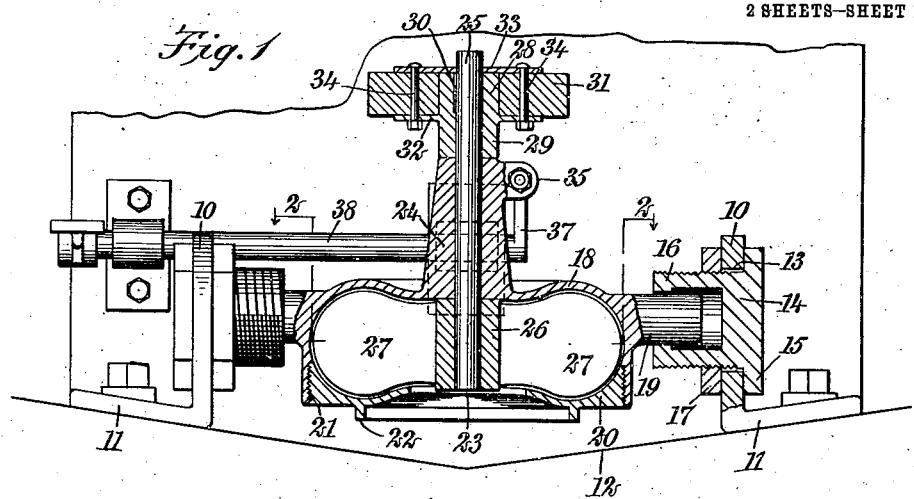
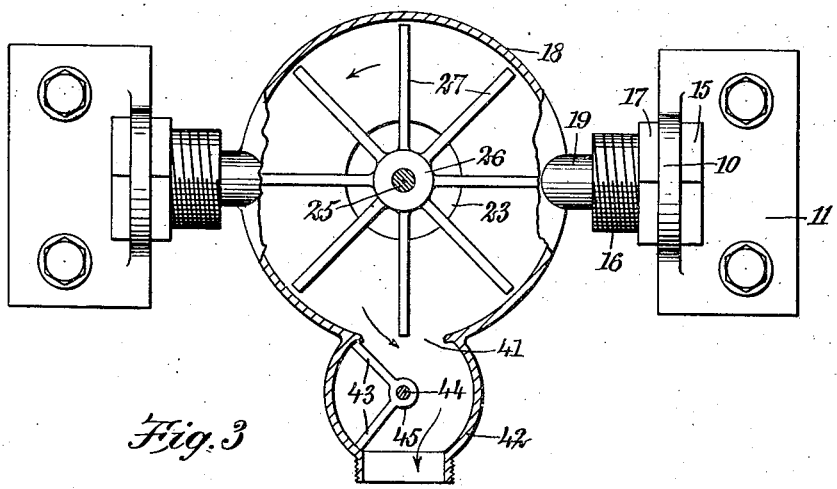
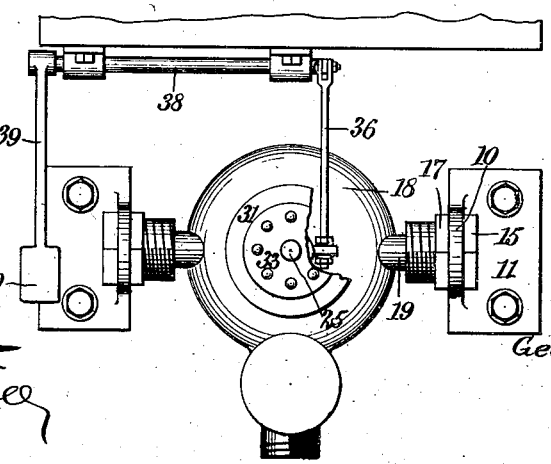
WITNESSES
INVENTOR
George E. Badger
BY
ATTORNEYS G. E. BADGER.
BILGE PUMP.
APPLICATION FILED FEB. 2, 1909.
1,008,235.
Patented Nov. 7, 1911.
2 SHEETS—SHEET 2.
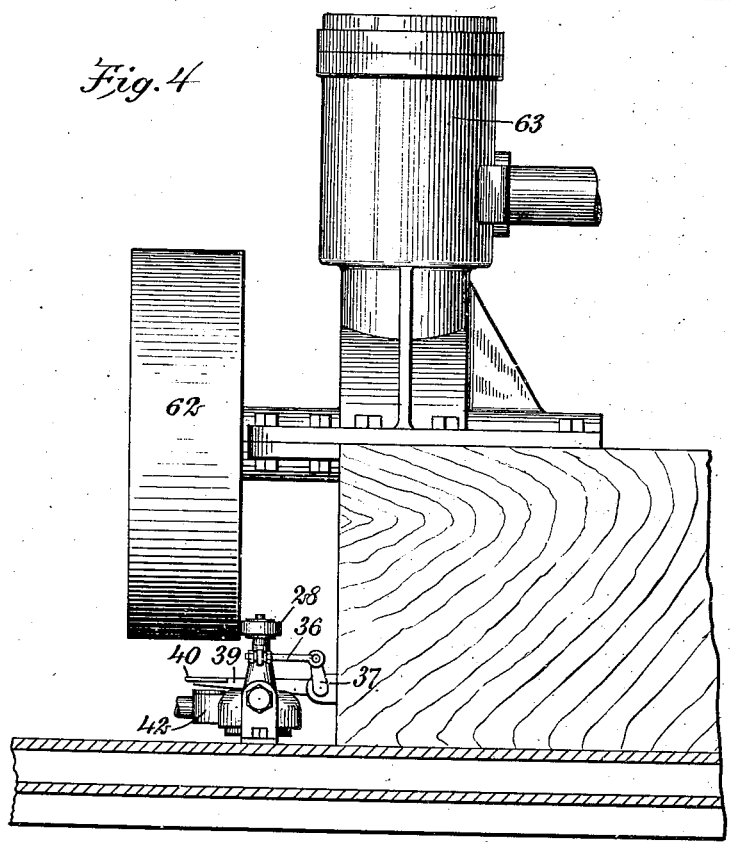
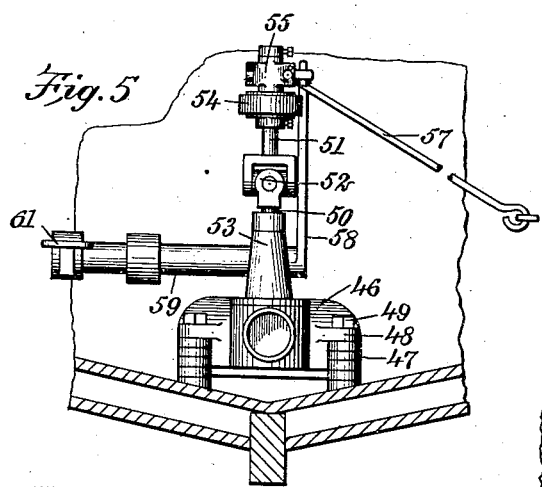
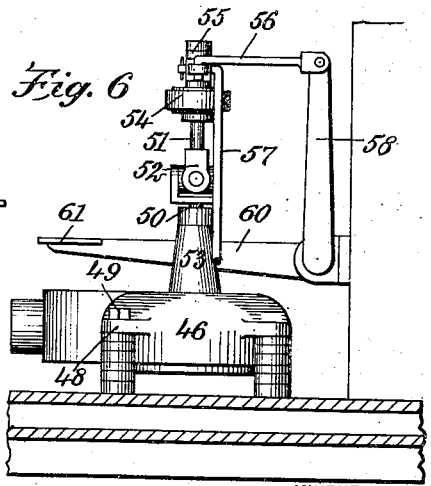
WITNESSES
INVENTOR
George E. Badger
BY
ATTORNEYS

UNITED STATES PATENT OFFICE.

GEORGE EDWARD BADGER, OF MAYGER, OREGON.

BILGE-PUMP.

1,008,235.   Specification of Letters Patent.   Patented Nov. 7, 1911.

Application filed February 2, 1909. Serial No. 475,579.

*To all whom it may concern:*

Be it known that I, GEORGE E. BADGER, a citizen of the United States, and a resident of Mayger, in the county of Columbia and State of Oregon, have invented a new and Improved Bilge-Pump, of which the following is a full, clear, and exact description.

My invention relates to bilge pumps, and it has for its object to provide a rotary pump for launches, which is driven by a friction wheel which may be thrown into and out of engagement with the fly wheel of the engine by a system of levers and connecting rods which are operated by a treadle.

Still other objects of the invention will appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a sectional elevation of my pump; Fig. 2 is a sectional view on the line 2—2 of Fig. 1; Fig. 3 is a plan view of the pump, a part of the friction wheel being broken away to show the connection of the thrust rod with the bearing; Fig. 4 is a side elevation of the invention as applied to a launch; Fig. 5 is an elevation of a modified form of the invention; and Fig. 6 is a side elevation of the same.

By referring to the drawings, it will be seen that standards 10 are provided, which have flanges 11, which are bolted to the bottom timbers of a launch 12; these standards 10 having orifices 13 therein, in which are disposed bearings 14 having flanges 15, which contact with the standards 10 at their outer sides, the bearings 14 having screw threads 16 therein, in which mesh nuts 17, which are adapted to screw against the standards 10 and thereby hold the bearings in place on the standards. A pump chamber 18 has trunnions 19, which are journaled in the said bearings 14. The bottom 20, of the chamber 18 has a screw thread 21, which meshes in the screw thread in the pump chamber 18, so that the bottom 20 is held in place and forms a permanent part of the pump chamber, but at any time it may be removed for repairs, this construction being also provided to lessen the cost of the pump, inasmuch as the bottom 20 of the pump chamber has a suction pipe 22, in which is disposed an inlet port 23. Integral with the pump chamber 18, there is a bearing 24, in which is disposed a shaft 25, said shaft extending into the pump chamber 18, and having secured to it a hub 26, to which are secured blades 27, to form a rotary pump. Beyond the bearing 24 there is a friction wheel 28 with a hub 29, the hub lying next to the upper portion of the bearing 24 and the friction wheel 28 being secured to the shaft 25 by means of a key 30. The friction wheel 28 is constructed by securing annular friction material 31 between flanges 32, integral with the hub 29, and a disk 33 disposed at the top of the friction wheel, bolts 34 passing through the disk 33, the flanges 32 and the friction material 31, to hold the friction material in place. To the bearing 24 is secured a flange 35 and to this flange is pivoted a thrust rod 36, said rod being pivoted to an arm 37, secured to a shaft 38, there being also a second arm 39, also secured to this shaft 38, a treadle 40 being mounted on the arm 39. At one side of the pump chamber 18 there is an outlet port 41, there being a communication 42 connected to this outlet port. In this communication 42, the inner surface of which is rounded, there is pivoted a hub 45, the pivot 44 being secured to the walls of the communication 42, and to this hub 45 are secured wings 43, the wings being adapted to adjust themselves to the fluid flowing from the pump chamber 18, so that when the shaft 25 is rotated, to carry the blades 27 in the direction indicated by the arrow in Fig. 2 of the drawings, the fluid will flow through the port 41 in the direction indicated by the arrow, but should the shaft 25 be rotated in the opposite direction, the wings 43 will be moved by the fluid to the right, to be disposed against the right wall of the communication 42, in the same way in which they are shown in Fig. 2 of the drawings, disposed against the left wall.

In the modified form of my invention shown in Figs. 5 and 6 of the drawings, a pump chamber 46, which is of the same construction as that shown in Figs. 1, 2 and 3 of the drawings, is mounted on washers 47, the pump chamber 46 having flanges 48, through orifices in which bolts 49 are disposed, the bolts 49 passing through the washers and securing the pump chamber 46 to the bottom of the launch. In this construction the pump chamber is firmly fastened to the bottom of the launch, and a shaft 50 is connected with a shaft 51 by means of a universal joint 52, the shaft 50 being journaled in a bearing 53 and having a hub and blades similar to those shown in Figs. 1, 2 and 3 of the drawings. A friction wheel 54 is also mounted on the shaft 51 in a manner similar to the way in which the friction wheel 31 is mounted on the shaft 25, but in the modified form of my invention, shown in Figs. 5 and 6, a bearing 55 is disposed above the friction wheel 54, there being pivoted to this bearing 55, a thrust rod 56 and a guy rod 57, the guy rod 57 being pivoted to the side of the launch and the thrust rod 56 being pivoted to an arm 58 secured to a shaft 59, there being also an arm 60 secured to the shaft 59, the arm 60 having a treadle 61.

In the operation of my invention, it will be seen, by referring to Fig. 4 of the drawings, that when the device is properly disposed, the friction wheel 28 may be brought in contact with a fly wheel 62 of an engine 63, to be driven by the fly wheel so that the shaft 25 will be rotated thereby, rotating the hub 26 with its blades 27, to draw the water up through the suction pipe 22 at the bottom of the launch and out of the port 41 to the communication 42. As the wings 43 are adapted to adjust themselves automatically, should the engine be reversed and the friction wheel 31 be still in contact with the fly wheel 62, the blades 27 will be directed in a direction opposite to that shown by the arrow in Fig. 2 of the drawings, which, however, will force the fluid by centrifugal force through the outlet port 41, as the wings 43 will be moved by the pressure of the fluid, to a position at the right of the communication 42, similar to that occupied by them, as shown in Fig. 2 of the drawings. When all the water has been pumped from the bottom of the launch by the operation of the treadle 40, the shaft 38 may be rotated, thereby actuating the thrust rod 36 to move the friction wheel 28 from the fly wheel of the engine.

In the modified form of my invention, shown in Figs. 5 and 6 of the drawings, the construction and operation are the same with the exception that the pump chamber 46 is stationary and does not move with the friction wheel 54, the shaft 50 being connected with the shaft 51 by a universal joint 52 to permit the friction wheel 54 to be moved to the fly wheel 62, to be driven thereby without any movement of the pump chamber 46 or the shaft 50, journaled in the bearing 53. The guy rod 57 tends to prevent any lateral displacement of the shaft 51 and the system of links and levers by means of which the shaft 51 is moved to and from the fly wheel is practically the same as that shown in the construction disclosed in Figs. 1, 2 and 3 of the drawings, with the exception that in the modified form of my invention, the additional bearing 55 is mounted above the friction wheel 54.

Having thus described my invention, I claim as new and desire to secure by Letters Patent:

1. In a bilge pump, a chamber, blades mounted therein, there being inlet and outlet ports in the chamber, means for driving the blades, a chamber in communication with the first-named chamber at one of the ports, and two radially disposed wings spaced apart and secured together adapted to rotate in the chamber.

2. In a bilge pump, a chamber, a fly wheel, a vertical shaft, the upper terminal of which is adapted to be moved to and from the fly wheel, blades adapted to be driven by the shaft disposed in the chamber, there being inlet and outlet ports in the chamber, a friction wheel keyed to the shaft adapted to be engaged by the fly wheel, a bearing for the upper terminal of the shaft, a thrust rod secured to the bearing, an arm pivoted to the thrust rod, a rock shaft to which the arm is secured, and means to rock the rock shaft.

3. In a bilge pump, a chamber, blades mounted therein, there being inlet and outlet ports in the chamber, means for driving the blades, a chamber in communication with the first-named chamber at one of the ports, two radially disposed wings spaced apart and secured together adapted to rotate in the chamber, and stops at each side of the last-mentioned port adapted for limiting the movement of the wings.

4. In a bilge pump, a chamber, blades mounted therein, there being inlet and outlet ports in the chamber, means for driving the blades, a fly wheel, which is adapted for driving the said means, means for moving the said means into and out of engagement with the fly wheel, a communicating means connected to the outlet port, there being a chamber in the communicating means, a pin disposed substantially in the center of the chamber, two wings secured together and spaced apart adapted to rock on the pin, and stops disposed in close proximity to the outlet port, which are adapted to check the movement of the wings.

5. In a bilge pump, a chamber having trunnions, standards in which the trunnions are journaled, there being inlet and outlet ports in the chamber, a shaft, blades mounted thereon which are disposed in the chamber, a friction wheel mounted on the shaft laterally, a fly wheel and means for moving the shaft relatively to the standards so that the friction wheel mounted thereon will engage the fly wheel at the will of the operator.

6. In a bilge pump, a chamber having trunnions, standards in which the trunnions are journaled, there being inlet and outlet ports in the chamber, a vertical shaft, blades mounted thereon which are disposed in the chamber, a friction wheel mounted on the shaft laterally, means for moving the shaft relatively to the standards, a second shaft, two arms secured thereto, and a rod secured to one of the arms, the rod being journaled to the first shaft.

7. In a bilge pump, a chamber having trunnions, standards in which the trunnions are journaled, there being an inlet port at the bottom of the chamber, a suction pipe encircling the inlet port, there being also an outlet port in the chamber, a vertical shaft, blades mounted thereon which are disposed in the chamber, a friction wheel mounted on the shaft, means for moving the shaft relatively to the standards, a communicating means having communication with the outlet port, two radially disposed wings secured together and pivoted in the communicating means, and stops adapted to limit the movement of the wings.

8. In a bilge pump, a chamber having trunnions, standards with orifices therein, bearings disposed in the orifices, the bearings having flanges which lie against the standards, the bearings also having nuts which screw on threads thereon, the flanges and nuts pressing on either side of the standards respectively to hold the bearings firmly relatively thereto, the trunnions being journaled in the said bearings, a shaft, blades mounted thereon which are disposed in the chamber, a friction wheel mounted on the shaft, and means for moving the shaft relatively to the standards, there being inlet and outlet ports in the chamber.

9. In a bilge pump, a chamber having trunnions, standards in which the trunnions are journaled, there being an inlet port at the bottom of the chamber and an outlet port at the outer side of the chamber, a shaft, blades mounted thereon, which are disposed in the chamber, a friction wheel mounted on the shaft, a fly wheel, and means for moving the shaft relatively to the standards so that the friction wheel mounted thereon will engage the fly wheel at the will of the operator.

10. In a bilge pump, a chamber, a fly wheel, a shaft, one end of which is disposed in the chamber, the other end of the shaft being adapted to be moved to and from the fly wheel, blades adapted to be rotated by the shaft disposed in the chamber, there being inlet and outlet ports in the chamber, a friction wheel keyed to the shaft and adapted to engage the fly wheel to be rotated thereby, a bearing for the said other end of the shaft, a thrust rod secured to the bearing, and means adapted for operating the thrust rod.

In testimony whereof I have signed my name to this specification in the presence of two subscribing witnesses.

GEORGE EDWARD BADGER.

Witnesses:
W. A. HALL,
J. L. WOODEN.